United States Patent
Tsuda

(10) Patent No.: US 10,275,059 B2
(45) Date of Patent: Apr. 30, 2019

(54) TERMINAL APPARATUS, DISPLAY CONTROL METHOD AND RECORDING MEDIUM

(71) Applicants: Sony Mobile Communications Inc., Tokyo (JP); Sony Corporation, Tokyo (JP)

(72) Inventor: Takamoto Tsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/616,158

(22) Filed: Jun. 7, 2017

(65) Prior Publication Data

US 2017/0269727 A1 Sep. 21, 2017

Related U.S. Application Data

(63) Continuation of application No. 13/873,993, filed on Apr. 30, 2013.

(60) Provisional application No. 61/641,322, filed on May 2, 2012.

(51) Int. Cl.
| | |
|---|---|
| *G06F 3/041* | (2006.01) |
| *G06F 3/0482* | (2013.01) |
| *G06F 3/0488* | (2013.01) |
| *G06F 3/048* | (2013.01) |

(52) U.S. Cl.
CPC ............ *G06F 3/041* (2013.01); *G06F 3/0482* (2013.01); *G06F 3/0488* (2013.01); *G06F 3/04883* (2013.01); *G06F 3/04886* (2013.01)

(58) Field of Classification Search
CPC ...... G06F 3/41; G06F 3/0482; G06F 3/04886; G06F 3/0488; G06F 3/04883
See application file for complete search history.

(56) References Cited

U.S. PATENT DOCUMENTS

| | | | |
|---|---|---|---|
| 2002/0163545 A1 | 11/2002 | Hii | |
| 2004/0036682 A1 | 2/2004 | Zobuchi | |
| 2005/0193351 A1* | 9/2005 | Huoviala | G06F 3/0482 715/815 |
| 2006/0095976 A1 | 5/2006 | Torres et al. | |

(Continued)

FOREIGN PATENT DOCUMENTS

| | | |
|---|---|---|
| EP | 1 976 242 A1 | 10/2008 |
| EP | 2 148 497 A1 | 1/2010 |

(Continued)

OTHER PUBLICATIONS

Office Action dated May 23, 2018, in European Patent Application No. 16159845.3, reference AO cited therein.

(Continued)

*Primary Examiner* — Ariel A Balaoing
(74) *Attorney, Agent, or Firm* — Xsensus LLP

(57) ABSTRACT

First, when operation input by a user is detected, an operation signal in accordance with contents of the operation is output. Next, a determination is made of whether the operation by the user is a short press operation or a long press operation on the basis of time in which the operation signal is output. Next, if determined that the user has performed the short press operation, a preview screen indicating contents of a predetermined event associated with the long press operation in advance is displayed on a screen of a display section as a preview.

9 Claims, 12 Drawing Sheets

(56) References Cited

U.S. PATENT DOCUMENTS

| | | | |
|---|---|---|---|
| 2008/0307363 A1* | 12/2008 | Jalon | G06F 17/30126 |
| | | | 715/835 |
| 2009/0195515 A1 | 8/2009 | Lee | |
| 2010/0020035 A1 | 1/2010 | Ryu et al. | |
| 2010/0302179 A1* | 12/2010 | Ahn | G06F 1/1618 |
| | | | 345/173 |
| 2011/0187750 A1 | 8/2011 | Ko et al. | |
| 2011/0271229 A1 | 11/2011 | Yu | |
| 2012/0159364 A1 | 6/2012 | Hyun | |
| 2012/0317515 A1 | 12/2012 | Wang et al. | |

FOREIGN PATENT DOCUMENTS

| | | |
|---|---|---|
| EP | 2 660 702 A2 | 6/2013 |
| JP | 2010-147973 | 7/2010 |
| WO | WO 2011/109931 A1 | 9/2011 |
| WO | WO 2012/007745 A2 | 1/2012 |

OTHER PUBLICATIONS

Extended Search Report dated Nov. 8, 2013 in European Application No. 13165929.4.

* cited by examiner

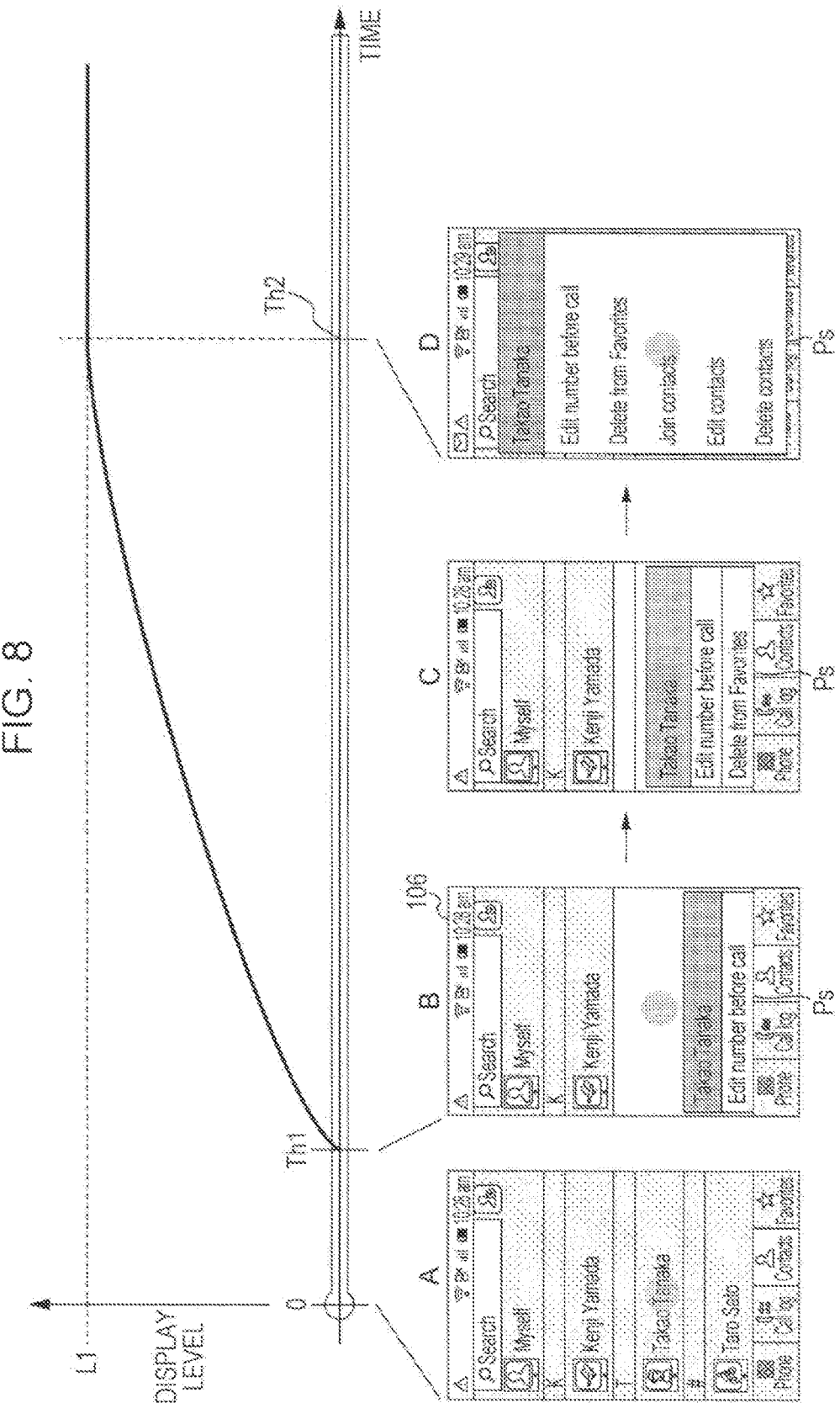

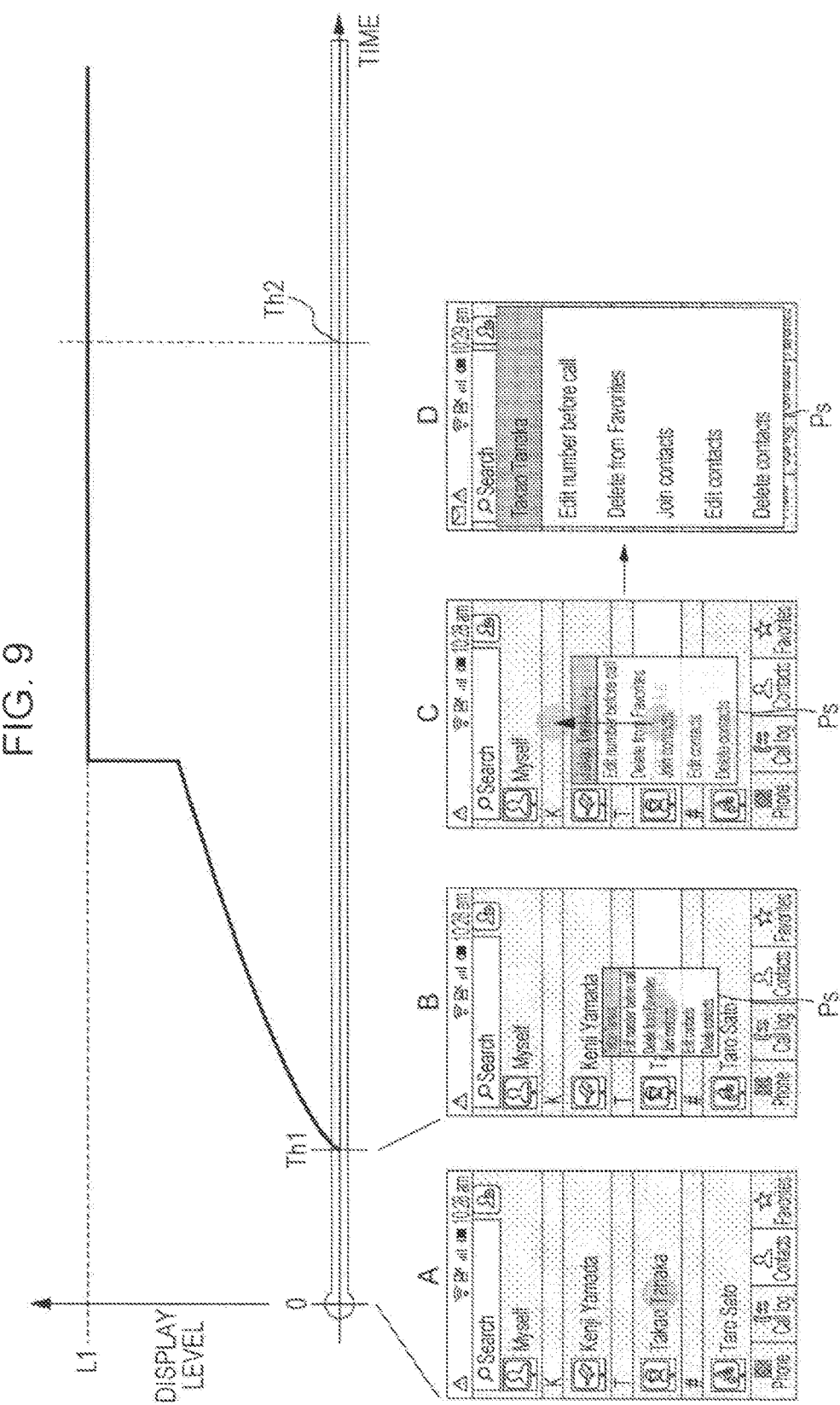

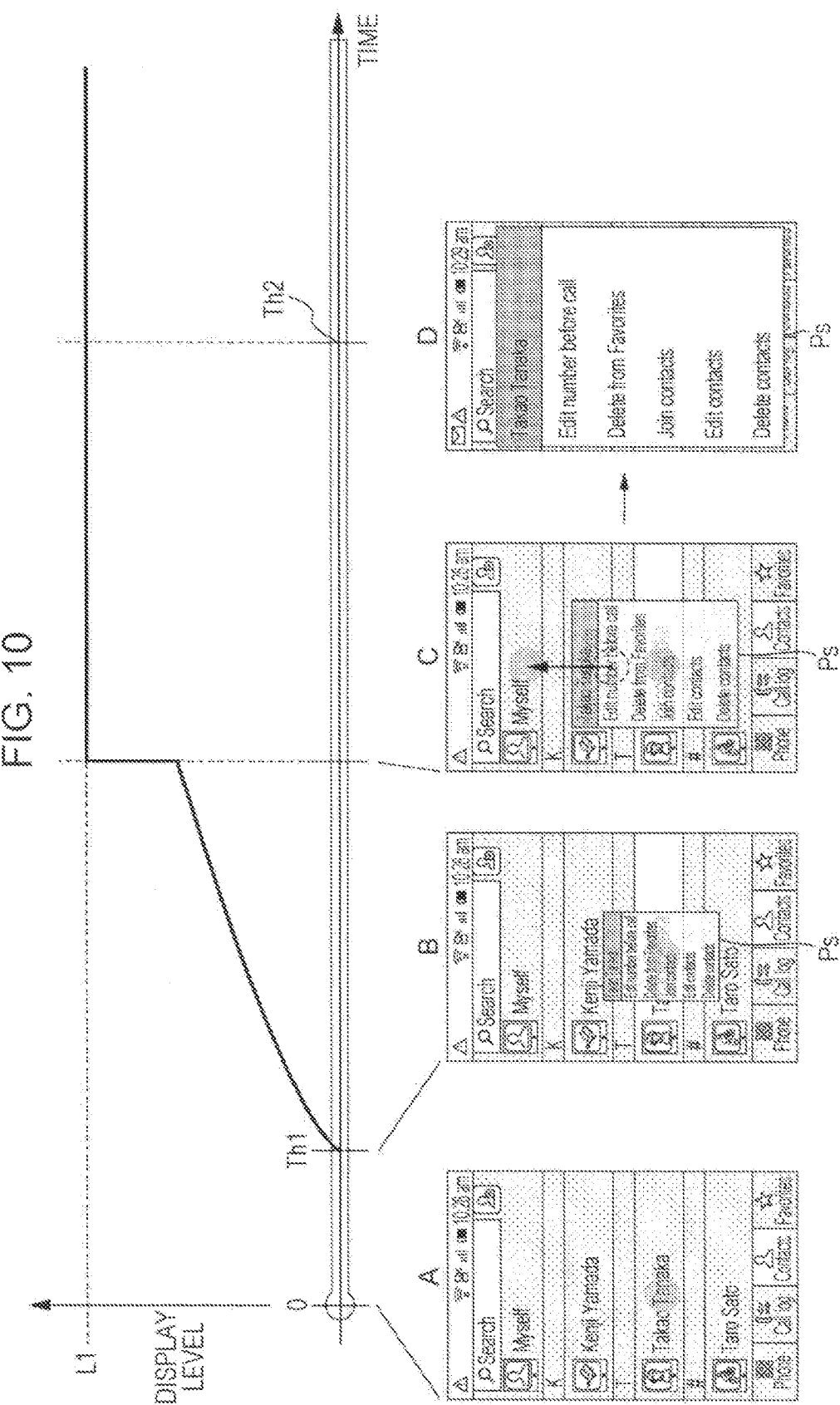

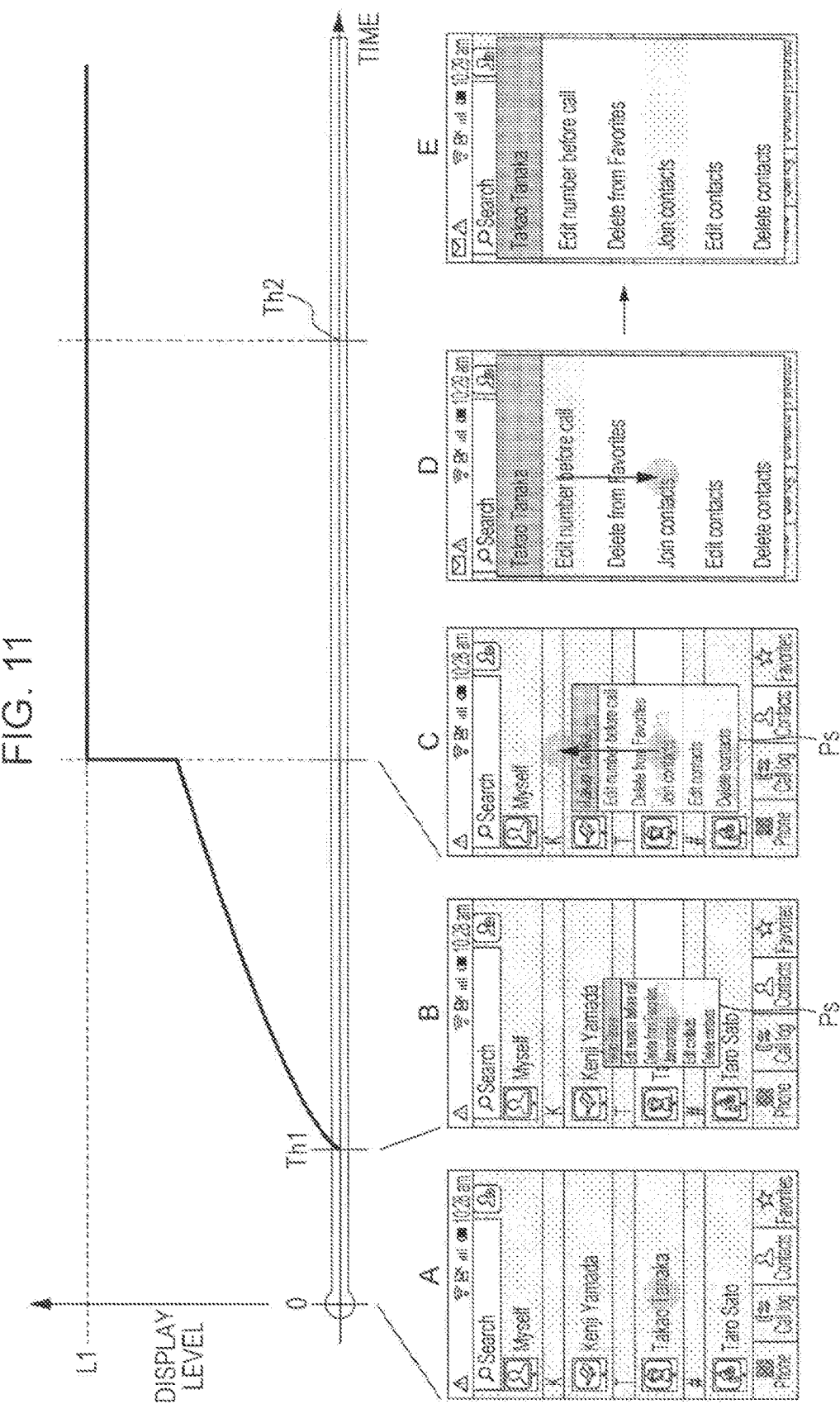

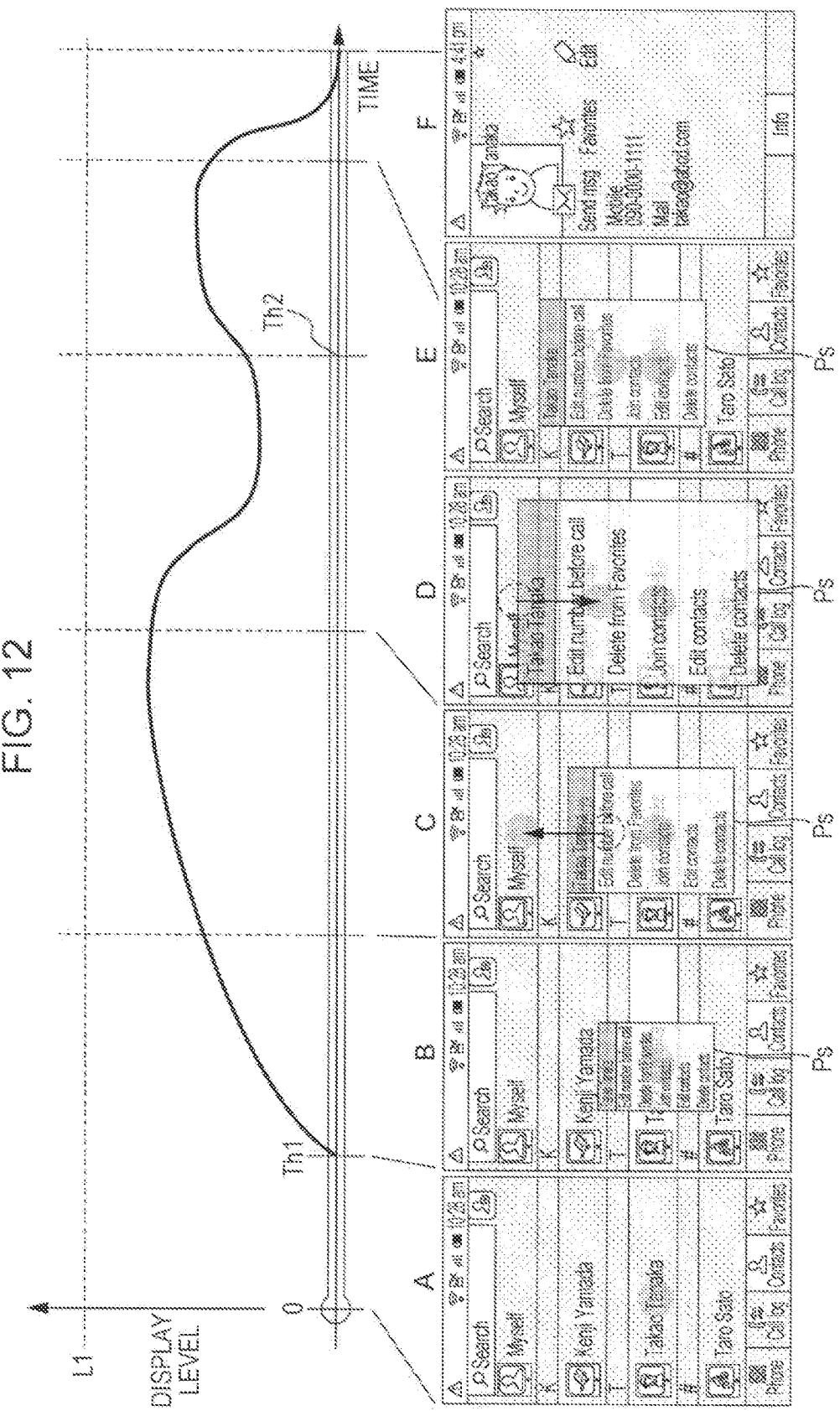

TERMINAL APPARATUS, DISPLAY CONTROL METHOD AND RECORDING MEDIUM

CROSS REFERENCE TO RELATED APPLICATION

The present application is a continuation of application Ser. No. 13/873,993, filed on Apr. 30, 2013, currently pending, which claims the benefit of the earlier filing date of U.S. Provisional patent application Ser. No. 61/641,322 filed in the USPTO on May 2, 2012, the entire contents of both of which being incorporated herein. by reference in their entireties.

TECHNICAL FIELD

The present disclosure relates to a terminal apparatus, a display control method and a recording medium, and more particularly, it relates to a technique for displaying on the basis of operation of an input device.

BACKGROUND ART

To date, a predetermined function has been assigned in advance to a long press operation that is performed on an input device, such as a button, a touch panel, etc., and the assigned function has been executed when the long press operation is actually performed. A long press operation is an operation in which an operation input time to an input device is a predetermined time or more. In general, a "long-press-operation determination time" for determining whether an input operation is a long press operation or not is set in advance, and if operation input time exceeds the long-press-operation determination time, that operation is determined to be a long press operation. For the long-press-operation determination time, for example, a value of about one second is set.

If the operation input time has not reached the long-press-operation determination time, that operation is determined to be a short press operation. Normally, a function that is different from the function assigned to a long press operation as assigned to a short press operation. If an operation input time is short, which is less than the long-press-operation determination time, the function assigned to the short press operation is executed. Accordingly, if a user accidentally has performed the long press operation without the user's intention, and as a result, the function assigned to the long press operation is performed, or the like, it has been difficult for the user to determine whether the function was performed as a result of the long press operation or not.

For example, Patent Literature 1 has disclosed a method of informing a user of whether an executed function is associated with a short press operation or a long press operation by changing vibration patterns of a vibration device depending on whether a long press operation has been detected or a short press operation has been detected.

CITATION LIST

Patent Literature

Japanese Unexamined Patent Application Publication No. 2010-147973

SUMMARY OF INVENTION

By the technique described in Patent Literature 1, it becomes possible for the user be informed whether an executed function is a short press operation or a long press operation. However, if the user is not aware of the long press operation itself, or is not aware that some function is assigned to the long press operation, there is a high possibility that the long press operation itself is not performed. In such a case, there is no chance that the function assigned to the long press operation is performed, and thus it is difficult for the user to find the function assigned to the long press operation. Also, even if the user is aware of a concept of the long press operation, it has been difficult for the user to figure out in advance what function is specifically assigned to the long press operation.

An inventor of the present disclosure has recognized the necessity of allowing the user to be informed of a phenomenon (event) that might occur as a result of a long press operation.

According to an embodiment of the present disclosure, there is provided a terminal apparatus including an input section, an input detection section, an operation determination section, and a display processing section. And configurations and functions of the individual sections are specified as follows. The input section is configured to receive input of an operation by a user. The input detection section is configured to output an operation signal in accordance with contents of the operation when the operation on the input section is detected. The operation determination section is configured to determine whether the operation by the user is a short press operation or a long press operation on the basis of time in which the input detection section is outputting the operation signal. If the operation determination section determines that the user has performed the short press operation, the display processing section is configured to display a preview screen indicating contents of a predetermined event associated with the long press operation in advance on a screen of a display section.

Also, according to an embodiment of the present disclosure, there is provided a method of controlling display. First, when an operation input by a user is detected, an operation signal in accordance with contents of the operation is output. Next, whether the operation by the user is a short press operation or a long press operation is determined on the basis of time in which the operation signal is output. Next, if determined that the user has performed the short press operation, a preview screen indicating contents of a predetermined event associated with the long press operation in advance is displayed as a preview on a screen of a display section.

Also, according to an embodiment of the present disclosure, there is provided a program that causes a computer to perform processing including: when an operation input by a user is detected, outputting an operation signal in accordance with contents of the operation; determining whether the operation by the user is a short press operation or a long press operation on the basis of time in which the operation signal is output; and if determined that the user has performed the short press operation, displaying a preview screen indicating contents of a predetermined event associated with the long press operation in advance as a preview on a screen of a display section.

Also, according to an embodiment of the present disclosure, there is provided a recording medium on which a computer implemented program for causing a computer to perform the following processing is recorded. When an operation input by a user is detected, an operation signal in accordance with contents of the operation is output. Next, a determination is made of whether the operation by the user is a short press operation or a long press operation on the basis of time in which the operation signal is output. Next, if determined that the user has performed the short press operation, a preview screen indicating contents of a predetermined event associated with the long press operation is displayed in advance as a preview on a screen of a display section.

By the present disclosures, when determined that the user has performed a short press operation, a preview screen indicating contents of a predetermined event associated with a long press operation in advance is displayed as a preview on a screen of a display section.

By the present disclosures, when a short press operation is performed, contents of a predetermined event associated with a long press operation in advance is displayed on a preview screen, and thus the user is allowed to be aware of a phenomenon (event) that might occur as a result of the long press operation at timing when the user performed the short press operation.

BRIEF DESCRIPTION OF DRAWINGS

FIG. 8 is an explanatory diagram illustrating an example of transitions of preview screens according to a variation 1B of the present disclosure.

FIG. 9 is an explanatory diagram illustrating an example of transitions of preview screens according to a variation 2A of the present disclosure.

FIG. 10 is an explanatory diagram illustrating an example of transitions of preview screens according to a variation 2B of the present disclosure.

FIG. 11 is an explanatory diagram illustrating an example of transitions of preview screens according to a variation 3 of the present disclosure.

FIG. 12 is an explanatory diagram illustrating an example of transitions of preview screens according to a variation 4 of the present disclosure.

DESCRIPTION OF EMBODIMENTS

In the following, descriptions will be given of embodiments for carrying out the present disclosure. In this regard, the descriptions will be given in the following order.

1. Example of Outer View Configuration of Terminal Apparatus

2. Example of Internal Configuration of Terminal Apparatus

3. Example of Control Section and Display Control Processing

4. Various Variations

[1. Example of Outer View Configuration of Terminal Apparatus]

Figure 1:
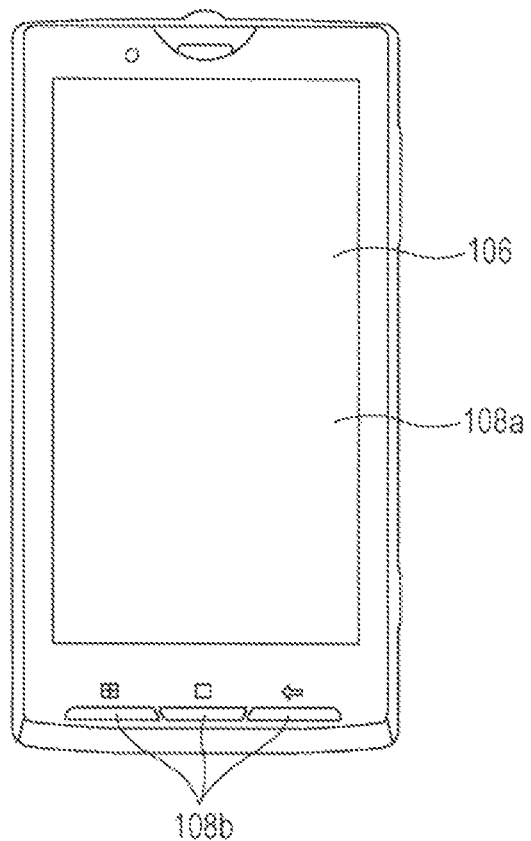
FIG. 1 is a schematic diagram illustrating an example of an outer configuration of a mobile phone terminal apparatus according to an embodiment of the present disclosure.

First, a description will be given of an example of an outer view configuration of a mobile phone terminal apparatus 100 to which a terminal apparatus according to the present disclosure is applied with reference to FIG. 1. FIG. 1 is a schematic diagram illustrating the example of the outer configuration of the mobile phone terminal apparatus 100. The mobile phone terminal apparatus 100 includes a casing 50, a touch panel 108a which is housed on a front surface part of the casing 50, a display section 106 which is laminated on the touch panel 108a, and operation keys 108b which are disposed on a lower end part, etc., of the front surface of the casing 50.

The touch panel 108a detects information on a screen position which a user's finger or a stylar object, which referred to as a stylus, etc., has contacted or come close to, and outputs the information to the outside as an operation signal. To a method of detecting a contact position, for example, a capacitive type is applied. The display section 106 includes a liquid crystal panel, an organic EL (Electro Luminescence) panel, etc., and information obtained with execution of various functions held by the mobile phone terminal apparatus 100, etc., is displayed.

In the present disclosure, when there is an input by a user on the touch panel 108a and the operation key 108b, a phenomenon that occurs as a result of a long press operation is displayed as a preview screen before long-press-operation determination time comes. The "long press operation" means an operation of the case where a time in which an object, such as a user's finger, etc., contacts or comes close to the touch panel 108a or the operation key 108b is a predetermined time or more. For the long-press-operation determination time, for example, one second, etc., is assumed to be set.

In this regard, an operation in the case where an object, such as a user's finger, etc., contacts or comes close to the touch panel 108a or the operation key 108b for less than a predetermined time is assumed to be referred to as a "short press operation". In an operation on as input device that exists physically, such as the operation key 108b, etc., it is assumed that an operation at a point in time when pressed is regarded as the short press operation, and a function that is assigned to the short press operation is executed.

On the other hand, in an operation on the touch panel 108a, a "short-press-operation determination time" is set, and it is assumed that an operation that continues input over this time is regarded as the short press operation. This is because it is necessary to distinguish a short press operation from various operations, such as a flick operation that touches a finger onto a screen and quickly flicks off, a drag operation, etc. For a short-press-operation determination time, for example, 0.2 second, etc., is assumed to be set.

[2. Example of Internal Configuration of Mobile Phone Terminal Apparatus]

Figure 2:
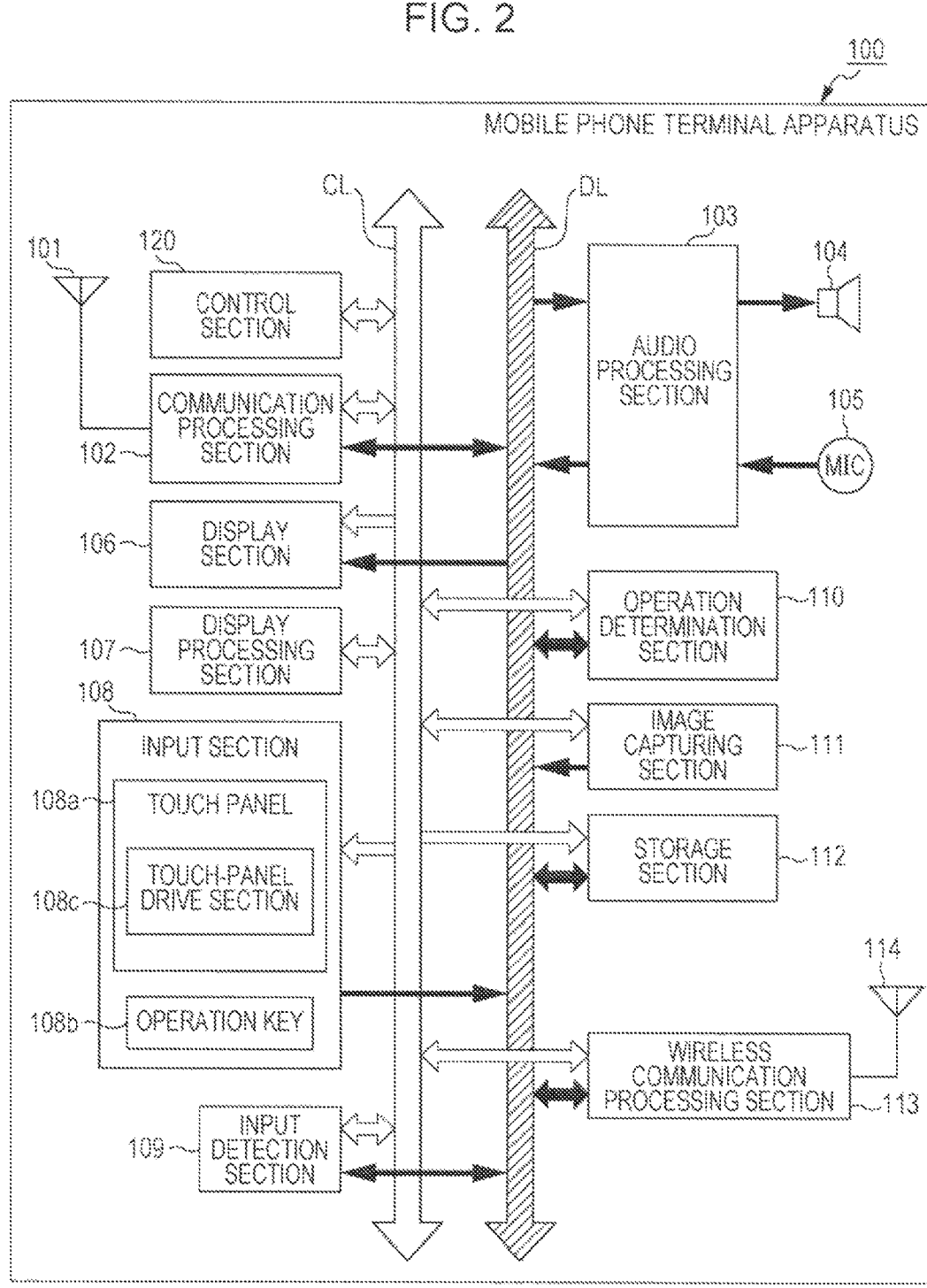
FIG. 2 is a block diagram illustrating an example of an inner configuration of a mobile phone terminal apparatus according to an embodiment of the present disclosure.

Next, a description will be given of an example of configuration of the mobile phone terminal apparatus 100 with reference to FIG. 2. The mobile phone terminal apparatus 100 includes an antenna 101 which performs transmission and receiving of radio waves with a wireless telephone base station, a communication processing section 102 to which the antenna 101 is connected, and a control section 120. Also, the mobile phone terminal apparatus 100 includes an audio processing section 103, a speaker 104, and a microphone 105.

The communication processing section 102 performs wireless communication with the wireless telephone base station under the control of the control section 120. At the time of voice communication, audio data included in data received by the communication processing section 102 is supplied to the audio processing section 103. And the audio processing section 103 performs decoding processing on the audio data to obtain an analog audio signal. The analog audio signal obtained by the audio processing section 103 is supplied to the speaker 104, and is output as sound. An audio signal obtained by collecting sound by the microphone 105 is also supplied to the audio processing section 103, and is coded into audio data in a predetermined coding format by the audio processing section 103. And the obtained audio data is supplied to the communication processing section 102, and is radiated as a radio wave through the antenna 101.

Also, the communication processing section 102 performs wireless communication processing at the time of connecting to the Internet. Each processing section, such as the communication processing section 102, the audio processing section 103, etc., exchanges control data with the control section 120 through the control line CL, and performs data transmission through the data line DL.

Also, the mobile phone terminal apparatus 100 includes a display section 106, a display processing section 107, an input section 108 (input interface), an input detection section 109, and an operation determination section 110. The display processing section 107 displays a screen that can be displayed as a result of a long press operation on the display section 106 as a preview screen on the basis of a determination result by the operation determination section 110 described later.

Also, the display processing section 107 performs control for changing an amount of data of the preview screen, specifically, a size of the screen and a transmission factor, etc., in accordance with a contact (or an approach) time by the user on/to the touch panel 108a and the operation key 108b. The size of the preview screen and the transmission factor are increased in stages in proportion to a length of the operation time so as to be 100% at the time of reaching the long-press-operation determination time, that is to say, so as to become an equal amount to the amount of data of normal screen.

The input section 108 includes the touch panel 108a described with reference to FIG. 1, and the operation key 108b. The touch panel 108a includes electrodes, which are not illustrated in the figure, disposed in a matrix state in an X direction and a Y direction, and each of the electrodes outputs a change in capacitance that arises when a user's finger or a stylar object, which is referred to as a stylus, etc., contacts or approaches the surface thereof as a detection value. In this regard, in the following description, "contact" with or "approach" to the touch panel 108a by an object, such as a user's finger, etc., is also jointly called "touch", and an approached or contacted position is also called a "touch position".

Driving the touch panel 108a is carried out by a touch panel drive section 108c. The touch panel drive section 108c scans each of the electrodes included in the touch panel 108a, and detects changes in capacitance in the X direction and in the Y direction. More specifically, the touch panel drive section 108c calculates coordinate values and capacitance values of a touch position when an object, such as a user's finger, etc., has approached to or contacted the surface of the touch panel 108a. And the touch panel drive section 108c outputs the calculated coordinate values and capacitance values to the control section 120 and the operation determination section 110, which are described later.

The input detection section 109 generates an operation signal in accordance with contents of an operation by the user on the basis of the coordinate values and the capacitance values of the touch position that are output from the touch panel drive section 108c, and supplies the operation signal to the control section 120 and the operation determination section 110. Also, when the user has performed operation input to the operation key 108b, the input detection section 109 generates an operation signal in accordance with contents of the input operation, and supplies the operation signal to the control section 120 and the operation determination section 110.

The operation determination section 110 determines whether the operation on the input section 109 by the user is a long press operation or a short press operation on the basis of the contents of the operation signal supplied from the input detection section 109. More specifically, a determination is made of whether contact or approach time by the user to the input section 108 is over a short-press-operation determination time Th1 or a long-press-operation determination time Th2, and outputs a determination result to the display processing section 107 and the control section 120 described later.

Also, the mobile phone terminal apparatus 100 includes an image capturing section 111, a storage section 112, a wireless communication processing section 113, and a control section 120. The image capturing section 111 includes an image sensor made of, for example, a CCD (Charge Coupled Device) or a CMOS (Complementary Metal Oxide Semiconductor), etc., and performs photoelectric conversion on subject light formed on a light receiving section thereof through a lens not illustrated in the figure to generate an image signal.

The storage section 112 is made of a ROM (Read Only Memory) or a RAM (Random Access Memory), and various application programs, necessary data at the time of executing them, etc., are stored. Information on the above-described short-press-operation determination time Th1 and long-press-operation determination time Th2 is also stored in the storage section 112. The wireless communication processing section 113 performs wireless communication with surrounding devices in a procedure based on a predetermined communication standard. The wireless communication is performed through an antenna 114. The control section 120 includes a microprocessor, etc., and performs communication control, audio processing and the control thereof, image processing and the control thereof, the other various kinds of signal processing and control of the individual sections, etc. Also, the control section 120 performs functions associated with the short press operations, and functions associated with the long press operations.

[3. Example of Control Section and Display Control Processing]

Next, a description will be given of an example of display control processing according to the present embodiment with reference to FIGS. 3A-3F to FIG. 6. In the following, an example of the case where an operation is performed on the touch panel 108a is given. FIGS. 3A-3F are explanatory diagrams explaining individual functions assigned to a short press operation and a long press operation according to an embodiment of the present disclosure. As will be discussed below, FIGS. 3A-3F illustrate an example of the case where the short press operation or the long press operation is performed in a state in which an address book is displayed.

Figure 3:
FIGS. 3A, 3B, 3C, 3D, 3E, and 3F are explanatory diagrams that explain a function assigned to a short press operation and a function assigned to a long press operation according to an embodiment of the present disclosure.

FIG. 3A is a diagram illustrating a state in which the address book is displayed on a screen in the display section 106. When a user taps a part where "Takao Tanaka" is displayed, as illustrated in FIG. 3B, color of a line of "Takao Tanaka" is inverted, and the display becomes a state indicating that a selection was made. As illustrated in FIG. 3O, if the user takes a finger off the screen immediately at this point in time, as illustrated in FIG. 3D, a screen illustrating a profile of "Takao Tanaka" is displayed. That is to say, a function of displaying a profile of the selected user is assigned to a short press operation, in which the user touches the screen and then takes a finger off immediately.

In a state in which the color of the line of "Takao Tanaka" is inverted as illustrated in FIG. 3B, if the user holds the finger on the screen (FIG. 3E), a screen on which items, such as "Edit number before call", etc., are described is displayed as shown in FIG. 3F. This screen is a screen for editing the profile of "Takao Tanaka" and a relationship with the user. That is to say, a function of editing a profile of the selected user or a relationship with the user is assigned to a long press operation, in which the user keeps touching the screen for a predetermined time.

Figure 4:
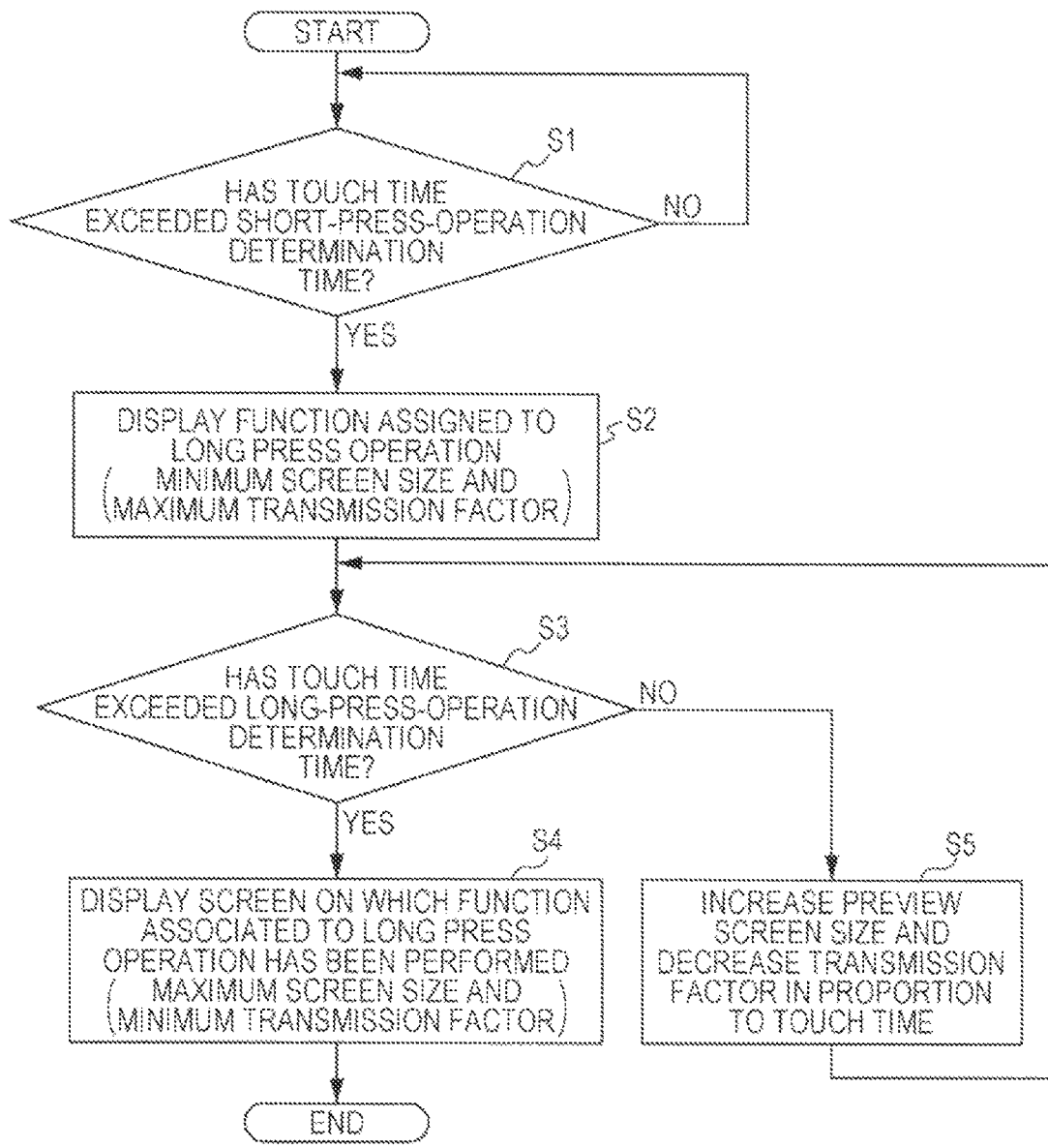
FIG. 4 is a flowchart illustrating an example of display control processing according to an embodiment of the present disclosure.

Next, a description will be given of an example of display control processing according to the present embodiment with reference to a flowchart in FIG. 4. If the input detection section 109 (refer to FIG. 2) determines that the user has performed a touch operation on the touch panel 108a, first, the operation determination section 110 determines whether a touch time, in which the touch panel is touched, has exceeded the short-press-operation determination time Th1 (step S1). If the touch time has exceeded the short-press-operation determination time Th1, the display processing section 107 displays a preview screen Ps indicating a function assigned to the long press operation. It is assumed that the size of the preview screen Ps is a minimum, and the transmission factor is a maximum (for example, 30%, etc.).

Next, a determination is made of whether the touch. time has exceeded the long-press-operation determination time Th2 (step 33), and if the touch time has exceeded the long-press-operation determination time Th2, a function associated with the long press operation is executed, and a screen accompanied by the execution of the function is displayed (step S4). That is to say, the size of the preview screen Ps becomes a maximum of 100%, and. the transmission factor becomes a minimum of 0%.

In step S3, if determined that the touch time has not exceeded the long-press-operation determination time Th2, control is performed so as to increase the size of the preview screen Ps in accordance with the touch time, and to decrease the transmission factor (step S5).

Figure 5:
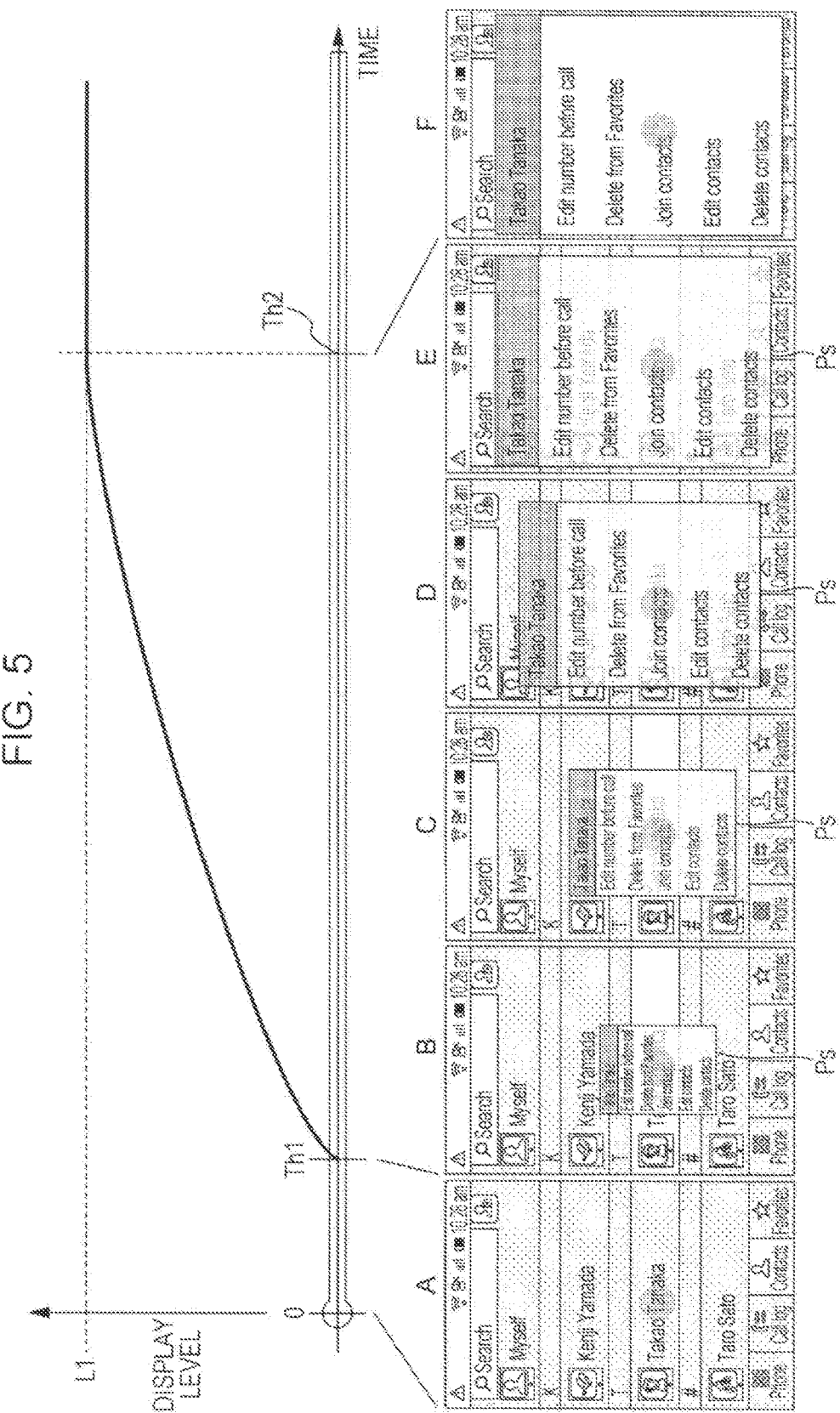
FIG. 5 is an explanatory diagram illustrating an example of screen transitions when a long press operation according to an embodiment of the present disclosure is performed.

FIG. 5 is an explanatory diagram illustrating an example of screen transitions that are displayed on the display section 106 when a long press operation according to the present embodiment is performed. A horizontal axis of a graph illustrated in an upper half of FIG. 5 represents time, and a vertical axis represents display level of the preview screen Ps. The display level of the preview screen Ps is a level indicating a size of the preview screen Ps and a transmission factor, and at a level L1, the size of the preview screen Ps becomes 100%, and the transmission factor becomes 0%.

A point on the graph denoted by 0" is a point at which a touch by the user has been detected. Here, as illustrated in FIG. 5A, it is assumed that a part displayed as "Takao Tanaka" has been. touched. If a continuation time of a touched state reaches the short-press-operation determination time Th1, as illustrated in FIG. 5B, the preview screen Ps is displayed at the touch position. This preview screen Ps presents an edit screen (refer to FIG. 3F) displayed as a result of the long press operation to the user as a preview. At the point in time of reaching the short-press-operation determination time Th1, the size becomes small, and the transmission factor becomes high. In this regard, a state of high transmission factor is, namely, a state in which the preview screen Ps is semitransparent, and is a state in which a screen originally displayed is transparently seen at a position overlapping the preview screen Ps. As the transmission factor becomes lower, the preview screen Ps becomes riot semitransparent, and thus a background screen thereof becomes more difficult to view.

As the touch time becomes longer, as illustrated in FIG. 5B to FIG. 5E, the size of the preview screen Ps becomes gradually larger, and the transmission factor becomes gradually lower. And if the touch time reaches the long-press-operation determination time Th2, as illustrated in FIG. 5F, the size of the preview screen Ps becomes a full size, and the transmission factor becomes 0%. That is to say, a same screen as the screen illustrated in FIG. 3F, which is displayed as a result of the long press operation, is displayed. At this time, the function assigned to the long press operation has been executed by the control section 120, and thus the preview screen Ps displayed in the full size is, namely, a screen as a result of the execution of the long press operation.

Figure 6:
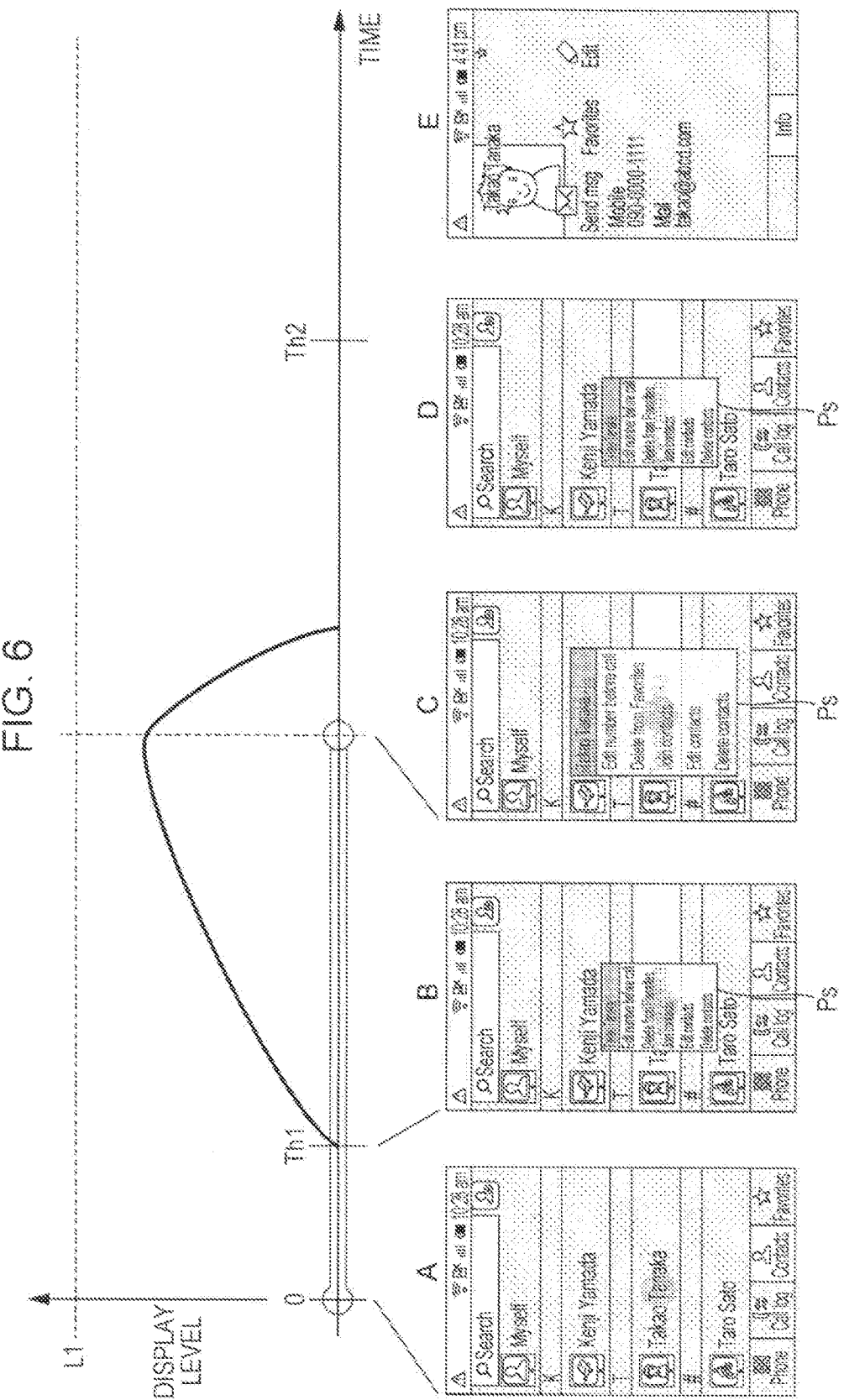
FIG. 6 is an explanatory diagram illustrating an example of screen transitions when a user's finger left a screen after a short press operation according to an embodiment of the present disclosure is performed.

FIG. 6 is an explanatory diagram illustrating an example of screen transitions that are displayed on the display section 106 when a user's finger left the screen in the middle according to the present embodiment. In FIG. 6, a same reference numeral is given to a corresponding part as that in FIG. 5, and a duplicated description will be omitted. In the example illustrated in FIG. 6, an example of screen transitions in the case where the user's finger left the screen at a point in time which is not less than the short-press-operation determination time Th1 and less than the long-press-operation determination time Th2 is illustrated.

As illustrated in FIG. 6A, when a part illustrated as "Takao Tanaka" is touched, and the short-press-operation determination time Th1 comes without change, as illustrated in FIG. 6B, an edit screen that can be displayed as a result of the long press operation is displayed as the preview screen Ps. If the touch state is held without change, as illustrated in FIG. 6C, the size of the preview screen Ps becomes large, and the transmission factor becomes low. At this time in time, when the user's finger leaves the screen of the display section 106, as illustrated in FIG. 6D, the size of the preview screen Ps becomes small. Although not illustrated in FIG. 6, when the user's finger leaves the screen, the preview screen Ps is controlled by the display processing section 107 so that the preview screen Ps becomes smaller in size just as fading out, and finally disappears from the screen.

And as the preview screen Ps disappears from the screen, as illustrated in FIG. 6E, a profile screen of "Takao Tanaka" that has been selected by the touch at a point in time of FIG. 6A is displayed. That is to say, a screen as a result of having executed a function assigned to the short press operation is displayed.

By the above-described embodiment of the present disclosure, even if an operation determined to be the short press operation, such as touching the screen, etc., is performed, an event that occurs as a result of the long press operation is displayed as the preview screen Ps. Accordingly, it becomes possible for the user to be aware that a function assigned to the long press operation is provided, and what that function is at a point in time when the short press operation is performed.

To date, in the case where the user intentionally performs a long press operation, and a touch is detected at a position different from an intended position on the screen, the user has come to be aware of the error only after the long-press-operation determination time Th2 has passed. However, by an embodiment of the present disclosure described above, soon after the short press operation is recognized, a function associated with a long press operation is displayed as the preview screen Ps. Thereby, even if a touch is detected at a position different from the intended position, the user is allowed to be aware of that immediately.

Also, by an embodiment of the present disclosure, the preview screen Ps becomes gradually larger in proportion to a continuation time of the touch state. Thereby, it is possible for the user to visually understand how long the long press operation ought to be continued in order to perform the function assigned to the long press operation.

Also, by an embodiment of the present disclosure, at a point in time before reaching the long-press-operation determination time Th2, a preview screen Ps indicating a function assigned to the long press operation is displayed, and that function is executed at a point in time when the long-press-operation determination time Th2 has come. That is to say, a function assigned to the long press operation will not be executed suddenly at a point in time when the long-press-operation determination time Th2 comes, and thus the user is allowed to wait for the execution time while checking the function by the preview screen Ps. That is to say, it is possible for the user to perform a long press operation securely while predicting what happens in the future.

Also, by an embodiment of the present disclosure embodiment, by taking the finger off the screen in the state of displaying the preview screen Ps before the long-press-operation determination time Th2 has come, the control section 120 performs the function assigned to the short press operation. That is to say, by performing the same operation as before, it is possible to execute a function assigned to the short press operation.

Also, by an embodiment of the present disclosure, when the user's finger left the screen on which the preview screen Ps is displayed, the preview screen Ps disappears, and a function assigned to the short press operation is executed. Accordingly, in the case where the user has attempted to execute the long press operation at first, but wants to stop the operation as a result of checking the function assigned to the long press operation by the preview screen Ps, it becomes possible for the user to easily stop the function assigned to the long press operation.

[4. Various Variations]

(Variation 1A)

Figure 7:
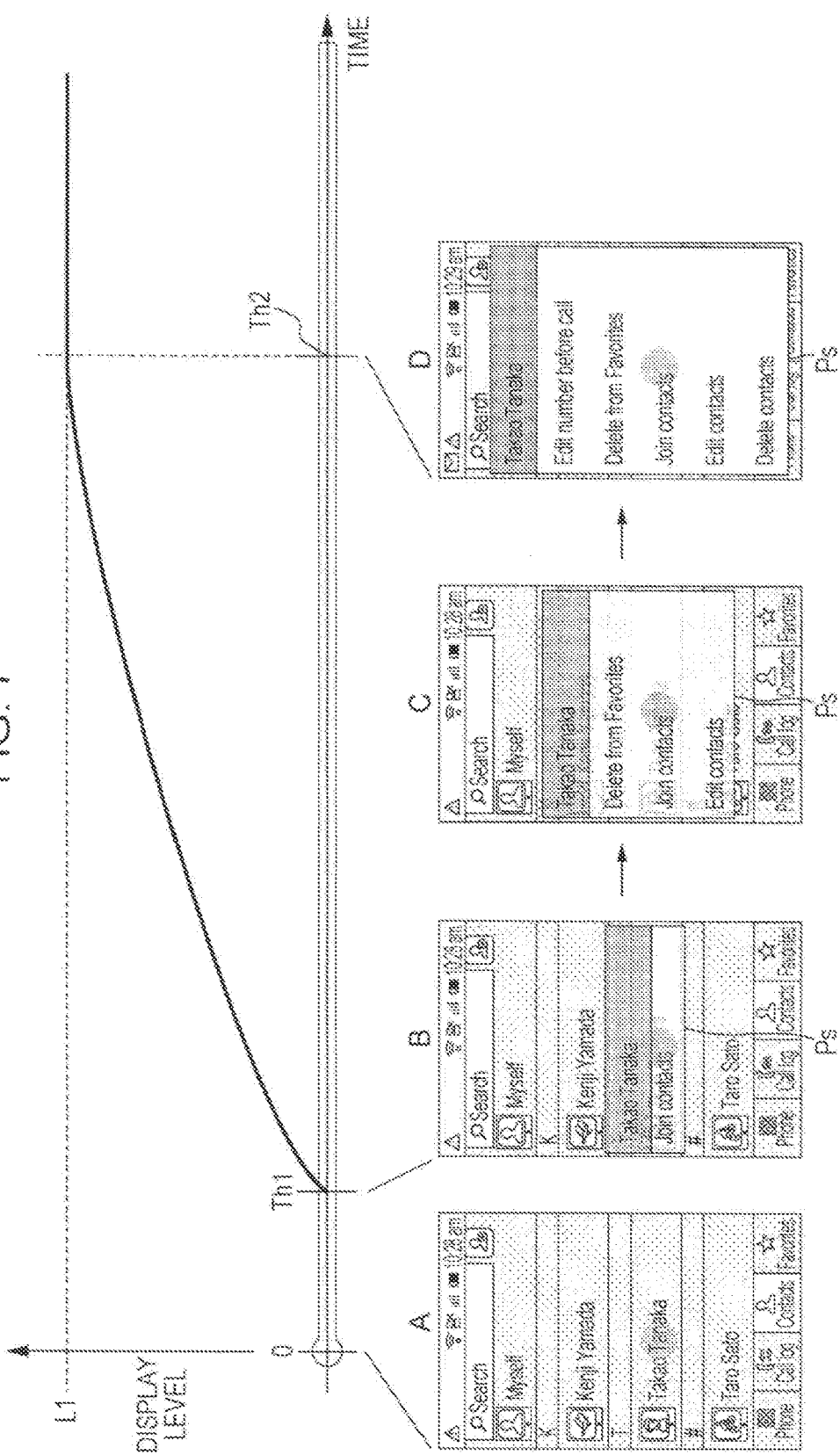
FIG. 7 is an explanatory diagram illustrating an example of transitions of preview screens according to a variation 1A of the present disclosure.

In this regard, in the above-described embodiment, an example in which the size of the preview screen Ps and the transmission factor are gradually increased in proportion to the touch time. However, the present disclosure is not limited to this. The amount of information to be displayed as the preview screen Ps may be gradually increased without changing the size of the preview screen Ps and the transmission factor. FIG. 7 is a diagram illustrating an example of transitions of the screens in the case of such processing. As illustrated in FIG. 7A, when the short-press-operation determination time Th1 has passed in a state in which the user touches a part displayed as "Takao Tanaka" on the address book, as illustrated in FIG. 7B, the preview screen Ps on which only a part of the edit screen is displayed is displayed. Here, an example in which only a menu of "join contacts" to be displayed in the middle of the edit screen in the vertical direction is displayed on the preview screen Ps is illustrated.

FIG. 7C is a diagram illustrating a display example of a screen at a point in time when a little time has passed from the point in time illustrated in FIG. 7B. On the screen illustrated in FIG. 7C, the menus displayed on the edit screen increased to three, namely, "Delete from Favorites", "Join contacts", and "Edit contacts". And at a point in time when the long-press-operation determination time Th2 has come, as illustrated in FIG. 7D, all the menus included in the edit screen are displayed on the preview screen Ps.

(Variation 1B)

Also, as an example of gradually increasing the amount of information to be displayed as the preview screen Ps, a form in which edit screen menus are gradually displayed in descending order from a top-line menu to lower line menus, etc., is also considered. FIG. 8 is a diagram illustrating an example of transitions of screens in the case of such processing. As illustrated in FIG. 8A, when the short-press-operation determination time Th1 has passed in a state in which the user touches a part displayed as "Takao Tanaka", as illustrated in FIG. 8B, the preview screen Ps on which only the top-line menu of the edit screen is displayed is displayed. In the example illustrated in FIG. 8B, the screen displayed up to that time is displayed in an upper-half area of the display section 106, and the preview screen Ps is displayed in the lower half.

FIG. 8C is a diagram illustrating a display example of a screen at a point in time when a little time has passed from the point in time illustrated in FIG. 8B. On the screen displayed in FIG. 8C, among the menus to be displayed on the edit screen, menus that are as far as a second menu from the top, "Edit number before call" and "Delete from Favorites", are displayed as the preview screen Ps. And at a point in time when the long-press-operation determination time Th2 has come, as illustrated in FIG. 8D, all the menus included in the edit screen are displayed on the preview screen Ps.

(Variation 2A)

Also, in the above-described embodiments, descriptions have been given of the case where a function assigned to the long press operation is executed at a point in time when the touch time on the screen exceeds the long-press-operation determination time Th2. However, the present disclosure is not limited to this. Even before the long-press-operation determination time Th2 has come, if the user performs a predetermined operation, a function assigned to the long press operation may be executed. For a predetermined operation, for example, an operation in which the user moves a finger that touches on the screen upward by sliding the finger, etc., is considered.

FIG. 9 is a diagram illustrating an example of transitions of preview screens in the case of such processing. As illustrated in FIG. 9A, when the short-press-operation determination time Th1 has passed in a state in which the user touches a part displayed as "Takao Tanaka", as illustrated in FIG. 9B, the preview screen Ps is displayed. An example of a screen in which the size of the preview screen Ps is further increased after passage of a little time from this point in time is illustrated in FIG. 9C. At this point in time, when an operation of the touching finger that moves upward with sliding is detected, as illustrated in FIG. 9D, an edit screen in the full size and with a transmission factor of 0% is displayed on the screen. That is to say, the screen produced as a result of the execution of the function assigned to the long press operation is displayed.

By performing such processing, it becomes possible to execute a function assigned to the long press operation before the long-press-operation determination time Th2 comes. Thereby, the user is allowed to execute the function associated with the long press operation without waiting for the passage of the long-press-operation determination time Th2. For example, it becomes possible for the user who wants to execute the long press operation by viewing the preview screen Ps or the user who has been aware of the function assigned to the long press operation in advance to execute the long press operation at a point in time when the user wants to execute the long press operation.

In this regard, in the example illustrated in FIG. 9, an example in which a function associated with the long press operation is executed by detection of an operation of sliding movement of the touching finger upward on the screen as a trigger has been given. However, the trigger is not limited to this example. The direction of the sliding movement of the finger may be a direction other than the upward direction. Also, the finger movement is not limited to a linear movement, and a movement including a curve may be an execution trigger associated with the long press operation.

(Variation 2B)

Also, not only in the case of sliding movement of one finger, but also in the case where touches with two fingers (multiple touches) are detected at the same time, a function associated with a long press operation may be executed. FIG. 10 is a diagram illustrating an example of screen transitions in the case of performing processing in such a way. As illustrated in FIG. 10A, when the short-press-operation determination time Th1 has passed in a state in which the user touches a part displayed as "Takao Tanaka", as illustrated in FIG. 10B, the preview screen Ps is displayed. An example of a screen in which the size of the preview screen Ps is further increased after passage of a little time from this point in time is illustrated in FIG. 10C. At this point in time, when a touch by a new finger is detected, and further, sliding movement upward by the finger that has newly touched on the screen is detected, a function associated with the long press operation is performed. And as illustrated in FIG. 10D, the edit screen as the function associated with the long press operation is displayed in a full size and with a transmission factor of 0% on the screen.

In this regard, sliding movement by the second finger may not trigger the execution of a function assigned to the long press operation, but detection of multiple touches, which is touched by a plurality of points at the same time, may simply used as a trigger. That is to say, any operation may be used as a trigger that executes a function associated with the long press operation as long as the operation is different from a touch operation to start displaying the preview screen Ps.

(Variation 3)

Also, as the examples that are illustrated in FIG. 9 and FIG. 10, when the function assigned to the long press operation is executed without waiting for the passage of the long-press-operation determination time Th2, a configuration may be employed such that the finger is not left from the screen, and is allowed to perform a next operation. FIG. 11 is a diagram illustrating an example of screen transitions in such processing. Screens illustrated in FIG. 11A to FIG. 11C are same as the screens illustrated in FIG. 9A to FIG. 9C, and FIG. 10A to FIG. 10C. That is to say, when a sliding movement by a finger upward on the screen is detected in a state of displaying the preview screen Ps, as illustrated in FIG. 11D, the edit screen is displayed in the full size and with a transmission factor of 0%.

And when the finger that touched on the screen is moved again without leaving, the control section 120 is caused to regard the operation as an operation on the edit screen. As illustrated in FIG. 11D, if the finger moves to a center of the screen, and stopped at a position. of a menu of "join contacts" (FIG. 11E), the display processing section 107 (refer to FIG. 2) considers that the user has selected "join contacts". And the menu of "join contacts" is executed (omitted to be illustrated in FIG. 11).

With this configuration, it becomes possible for the user to perform a series of operations from the execution of the function assigned to the long press operation to the selection of a menu on the screen after the execution only by movement operations of a finger upward and downward on the screen. That is to say, to date, it has been necessary to continue the long press operation until the long-press-operation determination time Th2 comes, and to select any item on the screen displayed as a result of the long press operation, namely two steps, whereas it becomes possible for the user to execute the same contents in one step and in a short time.

(Variation 4)

Also, in the above-described embodiments, the examples in which a function associated with the long press operation is executed when the long-press-operation determination time Th2 has passed have been given. However, the present disclosure is not limited to this. For example, a configuration in which even after the long-press-operation determination time Th2 has passed, a function assigned to the long press operation is not executed, that is to say, the state of displaying the preview screen Ps is maintained may be employed.

FIG. 12 is a diagram illustrating an example of screen transitions in such processing. As illustrated in FIG. 12A, when the short-press-operation determination time Th1 has passed in a state in which the user touches a part displayed as "Takao Tanaka", as illustrated in FIG. 12B, the preview screen Ps is displayed. After this, as illustrated in FIG. 12C, when a touch by a second finger is detected, and a sliding movement operation of the finger is detected, the display processing section 107 increases or decreases the size of the preview screen Ps in accordance with a direction of the sliding movement.

Specifically, as illustrated in FIG. 12C, if upward movement on the screen is detected, as illustrated in FIG. 12D, the size of the preview screen Ps is increased. Also, as illustrated in FIG. 12D, if downward movement on the screen is detected, as illustrated in FIG. 12E, the size of the preview screen Ps is decreased. In this manner, as long as the finger that moves with sliding does not leave the screen, even if the long-press-operation determination time Th2 has passed, the size of the preview screen Ps is changed in accordance with the direction of sliding movement.

And as illustrated in FIG. 12E, when a state in which two fingers are closed is detected, for example, in the case where a distance between touch positions (the first touch position and the second touch position) of two places detected on the screen becomes a predetermined distance, the display of the preview screen Ps is terminated. And a profile screen is displayed, which is a function assigned to the short press operation. Also, although omitted to be displayed in the figure, when the two fingers has completely opened, for example, touch positions of the two places detected on the screen become a predetermined distance or more, an edit screen is displayed, which is a function assigned to the long press operation.

With such a configuration, it is possible for a user to keep a state in which the user has not determined whether to perform a short press operation or a long press operation even after the long-press-operation determination time Th2 has passed. Also, even after the long-press-operation determination time Th2 has passed, it is possible for the user to execute a function assigned to the short press operation by putting the two fingers closer in order to perform an operation to make the size of the preview screen Ps smaller. That is to say, it becomes possible for the user to execute a function assigned to a short press operation or a long press operation at any timing of the user's preference regardless of the short-press-operation determination time Th1 and the long-press-operation determination time Th2.

In this regard, in the above-described embodiments and various variations, the examples in which a function assigned to the short press operation is displaying a profile, and a function assigned to the long press operation is displaying an edit screen of a profile have been given. However, the present disclosure is not limited to the examples. Further, it is not necessary that a function assigned to the short press operation, and a function assigned to the long press operation are different functions in a same application, and may be different functions in completely different applications. Also, it is not necessary that a function of an application is assigned, and it is possible to apply the cases where functions, such as creating a new folder, starting a call to a selected telephone number, etc., are assigned to the long press operation.

In this regard, a series of processing in the above-described embodiments can be executed by hardware, but can also be executed by software. When the series of processing is executed by software, it is possible to execute the software by a computer in which programs constituting the software is built in a dedicated hardware, or a computer in which programs for executing various functions are installed. For example, programs constituting the requested software ought to be installed in a general-purpose personal computer, etc., and ought to be executed.

Also, a recording medium on which program code of the software achieving the functions of the above-described embodiments may be supplied to a computer (or a control unit, such as a CPU, processing circuitry, etc.) of a system or an apparatus. Also, it goes without saying that the system or the apparatus may read the program code stored in the recording medium, and may execute the program code so as to achieve the functions.

For the recording medium for supplying the program code in this case, it is possible to use, for example, a flexible disk, a hard disk, an optical disc, a magneto-optical disk, a CD-ROM, a CD-R, a magnetic tape, a nonvolatile memory card, a ROM, etc.

Also, the computer executes the read program code so that the functions of the above-described embodiments are achieved. In addition, an OS, etc., performs a part of or all of actual processing on the basis of instructions of the program code. The cases where the functions of the above-described embodiments are achieved by the processing are also included in the disclosure.

Also, the present disclosure is not limited to the above-described embodiments, and various applications and variations are of course possible without departing from the gist of the present disclosure, which is described in the claims. It is to be understood by those skilled in the art as a matter of course that various alterations, combinations, the other embodiments may occur within the scope of the claims or the equivalents thereof.

In this regard, the present disclosure can also be configured as follows.

1. A terminal apparatus comprising:
an input interface configured to receive an input of an operation performed by a user; and
processing circuitry that implements
an input detection section that outputs an operation signal in accordance with contents of the operation in response to the operation being detected on the input interface,
an operation determination section that determines whether the operation by the user is a short press operation or a long press operation based on a time in which the input detection section outputs the operation signal, and
a display processing section configured to display a preview screen on a display device indicating contents of a predetermined event associated with the long press operation during a time period that the operation determination section associates with the short press operation.

2. The terminal apparatus of 1, wherein the display processing section displays the preview screen along with a screen associated with the short press operation.

3. The terminal apparatus of 2, wherein the display processing section progressively increases a size of the preview screen as a function of time.

4. The terminal apparatus of 3, wherein the size of the preview screen becomes a full screen size when the operation determination section determines that the operation is a long press operation.

5. The terminal apparatus of 4, wherein the display processing section progressively changes a transmission factor of the preview screen as a function of time.

6. The terminal apparatus of 5, wherein the transmission factor of the preview screen becomes 0% when the operation determination section determines that the operation is a long press operation.

7. The terminal apparatus of 2, wherein the display processing section progressively changes a transmission factor of the preview screen as a function of time.

8. The terminal apparatus of 7, wherein the transmission factor of the preview screen becomes 0% when the operation determination section determines that the operation is a long press operation.

9. The terminal apparatus of 1, wherein the input interface is a touch panel.

A display control method, comprising:
receiving an input via an input interface of an operation performed by a user;
outputting an operation signal from an input detection section in accordance with contents of the operation in response to the operation being detected on the input interface;
determining with. the processing circuitry that includes an operation determination section whether the operation by the user is a short press operation or a long press operation based on a time in which the outputting outputs the operation signal, and
displaying a preview screen on a display device indicating contents of a predetermined event associated with the long press operation during a time period that the determining associates with the short press operation.

11. The display control method of 10, wherein the displaying includes displaying the preview screen along with a screen associated with the short press operation.

12. The display control method of 11, wherein the displaying includes progressively increasing a size of the preview screen as a function of time.

13. The display control method of 12, wherein the size of the preview screen becomes a full screen size when the operation determination section determines that the operation is a long press operation.

14. The display control method of 13, wherein the displaying includes progressively changing a transmission factor of the preview screen as a function of time.

15. The display control method of 14, wherein the transmission factor of the preview screen becomes 0% when the operation determination section determines that the operation is a long press operation.

10. The display control method of 11, wherein the displaying includes progressively changing a transmission factor of the preview screen as a function of time.

17. The display control method of 16, wherein the transmission factor of the preview screen becomes 0% when the operation determination section determines that the operation is a long press operation.

18. The display control method of 10, wherein the receiving includes receiving the input via a touch panel.

19. A non-transitory computer readable storage device having computer readable instructions stored therein that when executed by processing circuitry performs a method, the method comprising:
receiving an input via an input interface of an operation performed by a user;
outputting an operation signal from an input detection section in accordance with contents of the operation in response to the operation being detected on the input interface;
determining with the processing circuitry that includes an operation determination section whether the operation by the user is a short press operation or a long press operation based on a time in which the outputting outputs the operation signal, and
displaying a preview screen on a display device indicating contents of a predetermined event associated with the long press operation during a time period that the determining associates with the short press operation.

20. The non-transitory computer readable storage device of 19, wherein
the displaying includes displaying the preview screen along with a screen associated with the short press operation.

REFERENCE SIGNS LIST

50 . . . casing, 100 . . . mobile phone terminal apparatus, 101 . . . antenna, 102 . . . communication processing section, 103 . . . audio processing section, 104 . . . speaker, 105 . . . microphone, 106 . . . display section, 107 . . . display processing section, 108 . . . input section, 108a . . . touch panel, 108b . . . operation key, 108c . . . touch panel drive section, 109 . . . input detection section, 110 . . . operation determination section, 111 . . . image capturing section, 112 . . . storage section, 113 . . . wireless communication processing section, 114 . . . antenna, 120 . . . control section, Th1 . . . short-press-operation determination Th2 . . . long-press-operation determination time

The invention claimed is:
1. A terminal apparatus comprising:
an input interface configured to receive an input of an operation performed by a user with an operation object; and
circuitry configured to
determine a location of the operation being detected on the input interface,
determine whether the operation by the user is a first press operation or a second press operation,
display a preview screen on a display device indicating contents of a predetermined event associated with the second press operation, during the first press operation, and
progressively increase a size of the preview screen as a function of time when the operation object is detected to remain at a substantially same location,
wherein the predetermined event on the display device is displayed at a location that includes the determined location of the operation when the operation changes from the first press operation to the second press operation without a leaving of the operation object.

2. The terminal apparatus of claim 1, wherein the size of the preview screen becomes a full screen size when the circuitry determines that the operation is the second press operation.

3. The terminal apparatus of claim 1, wherein
the circuitry is configured to progressively change a transmission factor of the preview screen as a function of time.

4. The terminal apparatus of claim 3, wherein the transmission factor of the preview screen becomes 0% when the processing circuitry determines that the operation is the second press operation.

5. The terminal apparatus of claim 1, wherein
the circuitry is configured to progressively change a transmission factor of the preview screen as a function of time.

6. The terminal apparatus of claim 5, wherein the transmission factor of the preview screen becomes 0% when the processing circuitry determines that the operation is the second press operation.

7. The terminal apparatus of claim 1, wherein
the input interface is a touch panel.

8. A method performed using a terminal apparatus having circuitry and an input interface configured to receive an input of an operation performed by a user with an operation object, the method comprising:
receiving, using the input interface, the input of the operation;
determining, using the circuitry, a location of the operation being detected on the input interface;
determining, using the circuitry, whether the operation by the user is a first press operation or a second press operation;
displaying, using the circuitry, a preview screen on a display device indicating contents of a predetermined event associated with the second press operation, during the first press operation; and
progressively increasing, using the circuitry, a size of the preview screen as a function of time when the operation object is detected to remain at a substantially same location,
wherein the predetermined event on the display device is displayed at a location that includes the determined location of the operation when the operation changes from the first press operation to the second press operation without a leaving of the operation object.

9. A non-transitory, computer-readable medium storing instructions that, when executed by a computing device, control the computing device to
receive an input of an operation performed by a user on an input interface with an operation object;

determine a location of the operation being detected on the input interface;

determine whether the operation by the user is a first press operation or a second press operation;

display a preview screen on a display device indicating contents of a predetermined event associated with the second press operation, during the first press operation; and progressively increase a size of the preview screen as a function of time when the operation object is detected to remain at a substantially same location, wherein the predetermined event on the display device is displayed at a location that includes the determined location of the operation when the operation changes from the first press operation to the second press operation without a leaving of the operation object.

* * * * *